(12) United States Patent
Yamazaki (10) Patent No.: US 10,935,822 B2
(45) Date of Patent: Mar. 2, 2021

(54) FOREIGN MATERIAL REMOVING DEVICE, FOREIGN MATERIAL REMOVING SYSTEM, AND FOREIGN MATERIAL REMOVING METHOD

(71) Applicant: SAKAI DISPLAY PRODUCTS CORPORATION, Sakai (JP)

(72) Inventor: Ikushi Yamazaki, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 80 days.

(21) Appl. No.: 16/309,086

(22) PCT Filed: Jun. 17, 2016

(86) PCT No.: PCT/JP2016/068140
§ 371 (c)(1),
(2) Date: Feb. 26, 2019

(87) PCT Pub. No.: WO2017/216963
PCT Pub. Date: Dec. 21, 2017

(65) Prior Publication Data
US 2019/0243170 A1    Aug. 8, 2019

(51) Int. Cl.
*G02F 1/13* (2006.01)
*B08B 5/00* (2006.01)
*B08B 6/00* (2006.01)
*B08B 5/02* (2006.01)
*B08B 5/04* (2006.01)

(52) U.S. Cl.
CPC .............. *G02F 1/1303* (2013.01); *B08B 5/00* (2013.01); *B08B 5/02* (2013.01); *B08B 5/04* (2013.01); *B08B 6/00* (2013.01); *G02F 2001/1316* (2013.01)

(58) Field of Classification Search
CPC   B08B 5/02; B08B 5/023; B08B 5/026; G02F 1/1303; G02F 2001/1316
See application file for complete search history.

(56) References Cited

U.S. PATENT DOCUMENTS 4,956,024 A  *  9/1990  Dean .......................... B08B 5/02
                                                     134/15
2011/0114125 A1 *  5/2011  Chen ................. H01L 21/67028
                                                     134/18

FOREIGN PATENT DOCUMENTS

| JP | S63-267414 A | 11/1988 |
| JP | H10-290964 A | 11/1998 |
| JP | H11-114507 A | 4/1999 |
| JP | 2013-123915 A | 6/2013 |
| JP | 2013-193061 A | 9/2013 |
| WO | 2011/039972 A1 | 4/2011 |

\* cited by examiner

*Primary Examiner* — Andrew A Horton
(74) *Attorney, Agent, or Firm* — ScienBiziP, P.C.

(57) ABSTRACT

This foreign material removing device for removing a foreign material adhered to a substrate is provided with: a jetting unit that jets a gas toward a substrate portion having a width smaller than the full width of the substrate; a foreign material suction unit that sucks, with the foreign material, the gas jetted toward the substrate from the jetting unit; and a covering body that covers the portion to which the gas is to be jetted by means of the jetting unit.

4 Claims, 6 Drawing Sheets

FOREIGN MATERIAL REMOVING DEVICE, FOREIGN MATERIAL REMOVING SYSTEM, AND FOREIGN MATERIAL REMOVING METHOD

TECHNICAL FIELD

The present invention relates to a foreign matter removing device, a foreign matter removing system, and a foreign matter removing method.

BACKGROUND ART

A known bonding device bonds a polarizing film to a liquid-crystal panel for manufacture of liquid-crystal display panels. Patent Literature 1 discloses a bonding device provided with a dust collector for removing dust adhering to a liquid-crystal panel by suction prior to a bonding process of bonding a polarizing film to the liquid-crystal panel. The dust collector includes a device main body that holds the liquid-crystal panel from above and below across the width of the liquid-crystal panel. The device main body has a buffer space inside thereof. The dust collector further includes a suction device located beneath the device main body for sucking the internal atmosphere of the device main body and thereby removing dust.

CITATION LIST

Patent Literature

[Patent Literature 1]
Japanese Patent Application Laid-Open Publication No. 2013-123915

SUMMARY OF INVENTION

Technical Problem

However, the bonding device disclosed in Patent Literature 1 sometimes fails to adequately remove dust adhering to a surface of the liquid-crystal panel to leave some foreign matter unremoved due to a configuration thereof in which dust is removed by sucking the internal atmosphere of the device main body while the dust collector is holding the liquid-crystal panel from above and below across the width of the liquid-crystal panel.

Note that such a problem is not specific to the bonding process of bonding a polarizing film to a liquid-crystal panel and applies to other processes. For example, a web cleaner is used to perform suction removal of foreign matter adhering to a TFT substrate and a color filter substrate, which form a liquid-crystal panel, after an alignment film has been formed on each of these substrates and before these substrates are bonded together. However, foreign matter can adhere to the substrates immediately before the bonding of the substrates and some of such foreign matter remains unremoved, causing defects to a certain degree. Any foreign matter remaining on the alignment films becomes held between the substrates when the substrates are bonded together, making the cell thickness of a resulting liquid-crystal panel non-uniform and causing defects. Such foreign matter also causes defective bright spots by serving as cores thereof.

The present invention has been made in view of the circumstances described above, and an object thereof is to provide a foreign matter removing device, a foreign matter removing system, and a foreign matter removing method that allow for adequate removal of foreign matter adhering to surfaces of substrates.

Solution to Problem

A foreign matter removing device according to the present invention is a device for removing foreign matter adhering to a substrate. The foreign matter removing device includes at least one injection section, a foreign matter sucking section, and a cover. The at least one injection section injects gas toward a region of the substrate. The region has a width shorter than an entire width of the substrate. The foreign matter sucking section sucks the gas injected toward the substrate from the at least one injection section together with the foreign matter. The cover covers the region toward which the at least one injection section injects the gas.

A foreign matter removing system according to the present invention includes a detector, a foreign matter removing device, and a controller. The detector detects a position of foreign matter adhering to or embedded in a surface of a substrate. The foreign matter removing device injects gas toward a region of the substrate and sucks the gas to perform removal of the foreign matter adhering to the surface of the substrate. The region has a width shorter than an entire width of the substrate. The controller controls operation of the foreign matter removing device based on a result of the detection by the detector. The controller includes a position information acquiring section, a specifying section, and an injection control section. The position information acquiring section acquires position information indicating the position of the foreign matter from the detector. The specifying section specifies the region of the substrate toward which the gas is to be injected based on the position information acquired by the position information acquiring section. The injection control section causes the gas to be injected toward the region specified by the specifying section.

A foreign matter removing method according to the present invention is a method for removing foreign matter adhering to a substrate. The foreign matter removing method includes detecting, specifying, injecting, and sucking. In the detecting, a position of foreign matter adhering to or embedded in a surface of the substrate is detected. In the specifying, a region of the substrate toward which gas is to be injected is specified based on at least position information indicating the detected position of the foreign matter. The region has a width shorter than an entire width of the substrate. In the injecting, the gas is injected toward the specified region. In the sucking, the gas injected toward the region is sucked together with the foreign matter.

Advantageous Effects of Invention

According to the present invention, it is possible to adequately remove foreign matter adhering to surfaces of substrates.

DESCRIPTION OF EMBODIMENTS

The following describes the present invention based on the drawings illustrating an embodiment of the present invention.

Figure 1:
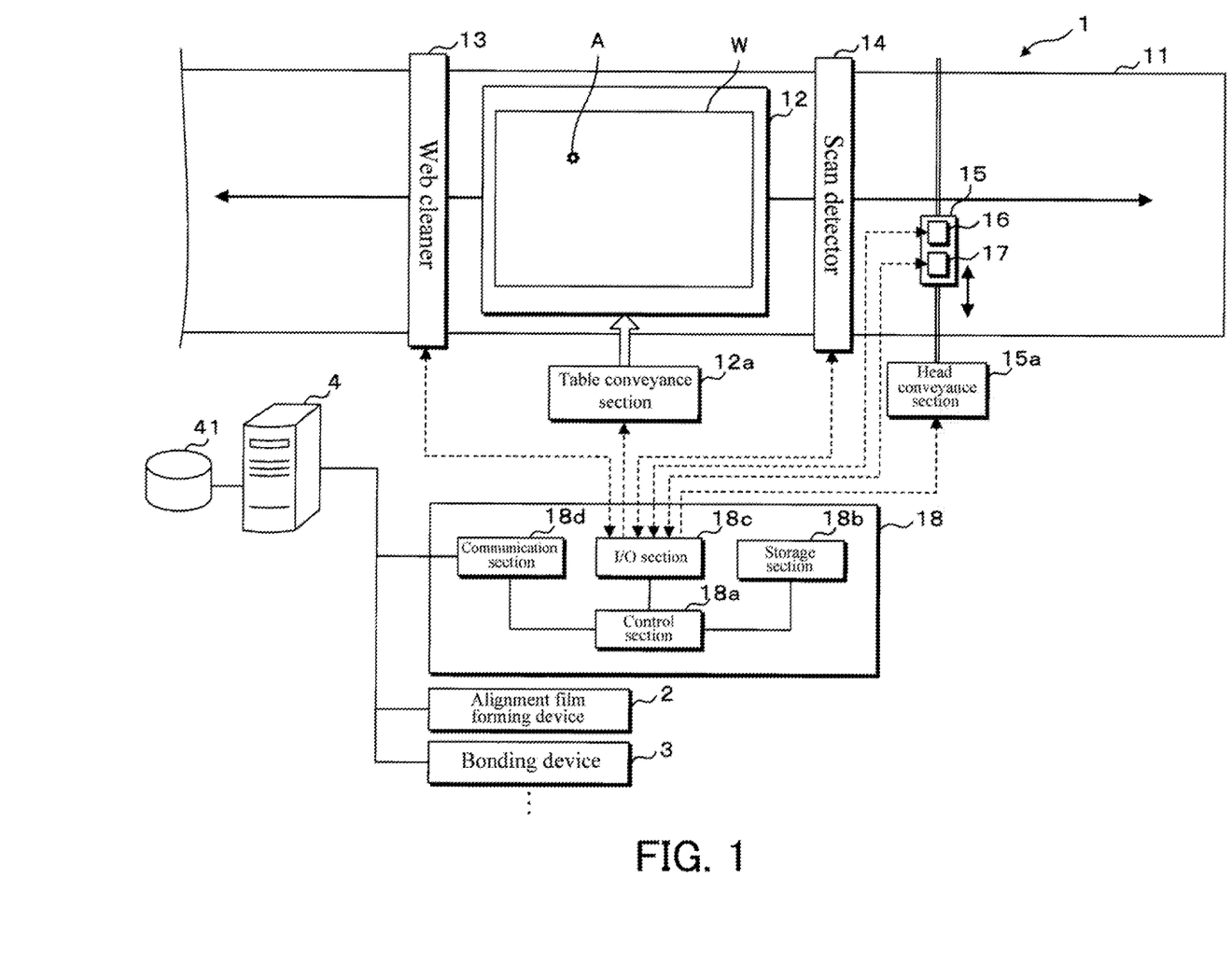
FIG. 1 is a conceptual diagram illustrating an example of a configuration of a substrate processing system including a foreign matter removing system according to an embodiment of the present invention.

FIG. 1 is a conceptual diagram illustrating an example of a configuration of a substrate processing system including a foreign matter removing system 1 according to the present embodiment. The substrate processing system according to the present embodiment includes various substrate processing devices such as the foreign matter removing system 1, an alignment film forming device 2, and a bonding device 3. The substrate processing system further includes a management device 4 that manages the operational condition of the system and the devices, and the condition and the like of a substrate W, which is a processing target. The substrate W, which is a processing target in the present embodiment, is for example each of liquid-crystal panel substrates for enclosing a liquid crystal therebetween. More specifically, the liquid-crystal panel substrates are for example a TFT substrate and a color filter substrate that form a liquid-crystal panel.

The alignment film forming device 2 forms, on the substrate W, an alignment film for aligning a group of liquid crystal molecules in a specific direction. The bonding device 3 bonds two substrates W together, which in other words are a TFT substrate and a color filter substrate, and fills a space between the substrates W with a liquid crystal after an alignment film has been formed on each substrate W. The foreign matter removing system 1 detects and removes foreign matter A adhering to each substrate W immediately before the two substrates W each having the alignment film formed thereon are bonded together. The probability of the occurrence of a defective liquid-crystal panel can be reduced by removing the foreign matter A adhering to the alignment films on the substrates W.

Figure 5A:
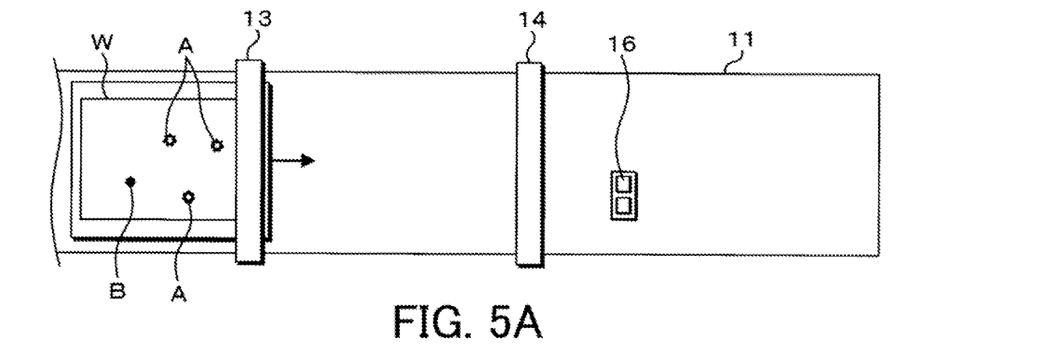
FIG. 5A is a schematic illustration of a foreign matter removing method according to the embodiment.

The management device 4 is a computer including a database 41, a communication device, and the like. The database 41 stores therein information indicating the condition of each substrate W in each process such as the alignment film formation and the bonding of substrates W. The communication device operates for exchanging information pertaining to the condition of each substrate W and information pertaining to each process with other devices such as the foreign matter removing system 1, the alignment film forming device 2, and the bonding device 3. According to the present embodiment, at least the alignment film forming device 2 detects a position of foreign matter B (see FIG. 5A) embedded in a substrate W of interest during formation of the alignment film on the substrate W and transmits foreign matter coordinate information to the management device 4. The foreign matter coordinate information includes information such as a substrate identifier identifying the substrate W and coordinates indicating a position of the embedded foreign matter B in the substrate W. Note that no particular limitations are placed on how the coordinates indicating positions of the foreign matter A and the embedded foreign matter B are represented. The positions of the foreign matter A and the embedded foreign matter B may be indicated by establishing and using an orthogonal coordinate system based on a specific position on the substrate W. The coordinates are also an example of how the positions of the foreign matter A and the embedded foreign matter B are represented.

The management device 4 receives the foreign matter coordinate information transmitted from the alignment film forming device 2 and stores the received foreign matter coordinate information in the database 41. The management device 4 also reads the foreign matter coordinate information of the substrate W from the database 41 and transmits the read foreign matter coordinate information to the foreign matter removing system 1 in response to a request from the foreign matter removing system 1.

The foreign matter removing system 1 includes a conveyance path 11 of the substrate W, a conveyance table 12, a table conveyance section 12a, a web cleaner 13, a scan detector 14, a head 15, a head conveyance section 15a, a foreign matter removing device 16 and an imaging device 17 that are held by the head 15, and a controller 18.

The conveyance path 11 is an elongated rectangular path along which the substrate W is conveyed in processes of detecting and removing the foreign matter A adhering to the substrate W One end of the conveyance path 11 in a longitudinal direction thereof is a terminus. The substrate W is conveyed to enter the conveyance path 11 from another end of the conveyance path 11 in the longitudinal direction, subjected to foreign matter removal, and then conveyed to exit from the other end. The one end of the conveyance path 11 is referred to below as a terminal end, and the other end thereof is referred to below as an opposite end as appropriate.

The conveyance table 12 is for example a frame that supports a periphery of the substrate W from below or a plate-like member that supports a lower surface of the substrate W from below. The conveyance table 12 is movable back and forth along the longitudinal direction of the conveyance path 11.

The table conveyance section 12a includes a ball screw mechanism or another conveyance mechanism such as a linear motor for moving the conveyance table 12 in the longitudinal direction of the conveyance path 11. The table conveyance section 12a moves the conveyance table 12 along the conveyance path 11 in accordance with a control instruction output from the controller 18.

The web cleaner 13 is a device located toward the opposite end of the conveyance path 11. The web cleaner 13 performs non-contact removal of the foreign matter A across the width of the substrate W. Specifically, the web cleaner 13 includes a prismatic housing. The housing is located above the conveyance path 11 with a longitudinal direction thereof substantially orthogonal to the longitudinal direction of the conveyance path 11 so as not to interfere with the conveyance table 12 that is moving. A lower face of the housing has a suction slit or suction ports arranged in the longitudinal direction of the housing. The housing is connected with a vacuum pump, not shown, for reducing pressure within the housing and sucks the foreign matter A adhering to the surface of the substrate W by sucking ambient air and gas through the suction ports or the suction slit. The web cleaner 13 having such a configuration can suck the foreign matter A adhering to the substrate W over a large area in a short period of time by operating while the substrate W is conveyed in the longitudinal direction of the conveyance path 11.

The scan detector 14 is for example disposed at a location midway between the web cleaner 13 and the terminal end of the conveyance path 11. The scan detector 14 detects a position of the foreign matter A adhering to the surface of the substrate W or a position of the embedded foreign matter B embedded in the surface of the substrate W by scanning the substrate W across the width of the substrate W. Specifically, the scan detector 14 includes a light emitter that emits light to the substrate W and a light receiver that detects light emitted by the light emitter and reflected off the surface of the substrate W. The scan detector 14 detects the foreign matter A and the embedded foreign matter B present on the surface of the substrate W based on an intensity, a reflection direction, and the like of the light reflected off the surface of the substrate W. The scan detector 4 is used for detecting the foreign matter A remaining on the substrate W without being removed by the web cleaner 13.

The scan detector 14 for example also optically reads the substrate identifier of the substrate W. The substrate identifier is readably displayed in an appropriate position on the substrate W. The scan detector 14 then outputs the foreign matter coordinate information including the substrate identifier and the coordinates of the positions of the adhering foreign matter A and the embedded foreign matter B on the substrate W to the controller 18.

Note that the scan detector 14 is able to detect any foreign matter A present on the surface of the substrate W but is unable to distinguish the embedded foreign matter B from the foreign matter A adhering to the surface of the substrate W. The scan detector 14 is an example of a detector that detects the positions of the adhering foreign matter A and the embedded foreign matter B on the surface of the substrate W. The scan detector 14 may alternatively be configured to capture an image of the substrate W across the width of the substrate W and detect the foreign matter A present on the surface of the substrate W.

The foreign matter removing device 16 is mounted on the head 15 such that a direction of a gas jet therefrom is downward. The imaging device 17 is also mounted on the head 15 such that a direction of imaging is downward. The head 15 is a device that moves in a width direction of the conveyance path 11, which in other words is a direction orthogonal to the longitudinal direction of the conveyance path 11, and changes positions of the foreign matter removing device 16 and the imaging device 17 relative to the substrate W. Specifically, a guide rail extending in a direction substantially orthogonal to the longitudinal direction of the conveyance path 11 is provided above the conveyance table 12 and in the vicinity of an end (a right end in FIG. 1) of the scan detector 14 toward the terminal end so as not to interfere with the conveyance table 12 that is moving. The head 15 is supported so as to movable back and forth along a guide rail. The foreign matter removing device 16 and the imaging device 17 can be opposed to a desired location on the surface of the substrate W by moving the conveyance table 12 in the longitudinal direction of the conveyance path 11 and moving the head 15 in the width direction of the conveyance path 11.

The head conveyance section 15a includes a ball screw mechanism or another conveyance mechanism such as a linear motor for moving the head 15 along the guide rail. The head conveyance section 15a moves the head 15 along the guide rail in accordance with a control instruction output from the controller 18.

The head 15 includes a lift mechanism for raising and lowering at least the foreign matter removing device 16. The position of the foreign matter removing device 16 relative to the substrate W in an up-down direction is controlled by the controller 18.

The foreign matter removing device 16 performs removal of the foreign matter A adhering to the surface of the substrate W by injecting and sucking gas toward and from a region of the substrate W that has a width shorter than the entire width of the substrate W. The foreign matter removing device 16 performs the foreign matter removal in accordance with a control instruction output from the controller 18. The foreign matter removing device 16 will be described in detail below.

The imaging device 17 includes an image sensor such as a CCD image sensor or a CMOS image sensor that captures an image of the region having a width shorter than the entire width of the substrate W, which in other words is a range to be subjected to the foreign matter removal by the foreign matter removing device 16. The imaging device 17 captures an image of the surface of the substrate W and outputs image data obtained by capturing the image to the controller 18 in accordance with a control instruction output by the controller 18. Note that the imaging device 17 is merely an example. The imaging device 17 may alternatively have a configuration similar to the scan detector 14 in which detection light is emitted to a specific region of the substrate W and reflected light is detected to determine the presence or absence of the foreign matter A on the substrate W, as long as the configuration allows for detection of the foreign matter A that may be remaining in the region subjected to the foreign matter removal by the foreign matter removing device 16.

The controller 18 includes a control section 18a, a storage section 18b, an input/output section 18c, and a communication section 18d. The control section 18a is a microcomputer having for example a central processing unit (CPU) and read only memory (ROM). The storage section 18b, the input/output section 18c, and the communication section 18d are connected to the control section 18a.

The storage section 18b for example includes non-volatile memory such as electrically erasable programmable ROM (EEPROM) and flash memory, and volatile memory such as random access memory (RAM). The non-volatile memory of the storage section 18b stores therein a control program necessary for the controller 18 to control operation of the foreign matter removing device 16. The storage section 18b also stores therein the foreign matter coordinate information including the position of the embedded foreign matter B embedded in the substrate W during the alignment film formation on the substrate W preceding the foreign matter removal.

The input/output section 18c is an interface for inputting and outputting various signals under control by the control section 18a. The table conveyance section 12a, the web cleaner 13, the scan detector 14, the head conveyance section 15a, the foreign matter removing device 16, and the imaging device 17 are connected to the input/output section 18c. For example, under control by the control section 18a, the input/output section 18c can output control instructions to the web cleaner 13 and the foreign matter removing device 16 to cause the web cleaner 13 and the foreign matter removing device 16 to operate. Likewise, the input/output section 18c can output control instructions to the table conveyance section 12a and the head conveyance section 15a to cause the table conveyance section 12a to move the conveyance table 12 along the conveyance path 11 and cause the head conveyance section 15a to raise or lower the head 15 as well as to move the head 15 in the width direction of the conveyance path 11. The input/output section 18c can also output control instructions to the scan detector 14 and the imaging device 17 to cause the scan detector 14 and the imaging device 17 to respectively perform end-to-end detection and local detection of the foreign matter A adhering to the substrate W, and can input detection results that are output from these devices.

Figure 2:
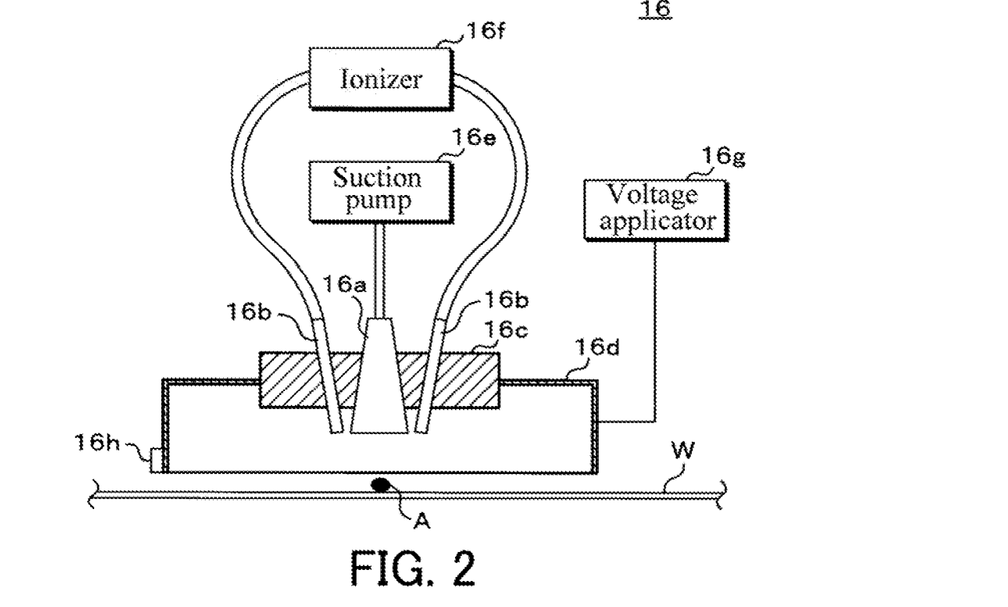
FIG. 2 is a side cross-sectional view of an example of a configuration of a foreign matter removing device according to the embodiment.
Figure 3:
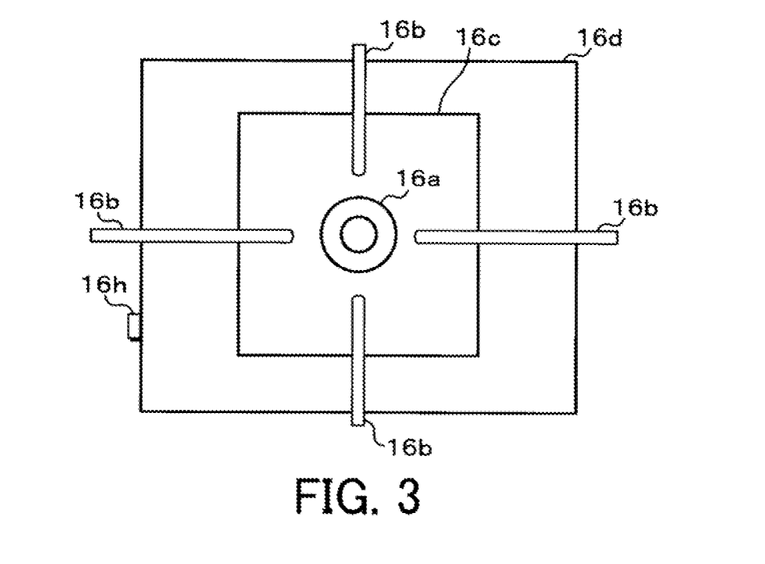
FIG. 3 is a plan view of the foreign matter removing device according to the embodiment.

FIG. 2 is a side cross-sectional view of an example of a configuration of the foreign matter removing device 16 according to the present embodiment. FIG. 3 is a plan view of the foreign matter removing device 16 according to the present embodiment. The foreign matter removing device 16 includes a plurality of injection sections 16b that inject gas toward the region having a width shorter than the entire width of the substrate W, a foreign matter sucking section 16a that sucks the gas injected toward the substrate W together with the foreign matter A, a retaining section 16c that retains the injection sections 16b and the foreign matter sucking section 16a in respective specific orientations, and a cover 16d that covers the region toward which the gas is injected.

The injection sections 16b are for example tubes each having an end connected to an ionizer 16f. The ionizer 16f has a discharge electrode for ionizing the gas, a blower, and the like, and supplies the ionized gas to the tubes. The ionized gas is injected from another end of each tube through driving of the ionizer 16f. The foreign matter A electrostatically adhering to the substrate W is discharged by the ionized gas injected toward the substrate W and removed from the substrate W by the blow of the gas. The other end of each tube is also referred to below as an injection port as appropriate.

The foreign matter sucking section 16a is for example a hollow conical cylinder tapered so as to have a diameter that becomes increasingly large toward a lower end, and a suction pump 16e is connected to a top of the cylinder. The gas is sucked together with the foreign matter A through a bottom opening of the cylinder through driving of the suction pump 16e. The lower opening of the cylinder is also referred to below as a suction port as appropriate.

The cover 16d has a hollow rectangular parallelepiped shape having an open tower face. The retaining section 16c is provided in a central region of a top face of the cover 16d. The cover 16d is for example formed of metal mesh and has side faces for surrounding at least four sides of the region toward which the gas is injected. Preferably, the top face of the cover 16d covers the region from above. A voltage applicator 16g that applies voltage to the cover 16d is connected to the cover 16d. The voltage applicator 16g applies a specific constant voltage to the cover 16d to catch the foreign matter A detached from the substrate W using electrostatic force.

The retaining section 16c is for example a resin member. The foreign matter sucking section 16a is disposed in a substantially central region of the retaining section 16c with the suction port thereof facing downward and is retained in a position and an orientation to be surrounded by the cover 16d. The injection sections 16b are arranged around the foreign matter sucking section 16a with the injection ports thereof each facing a specific location under the suction port of the foreign matter sucking section 16a and are retained in respective positions and orientations to be surrounded by the cover 16d. Preferably, the injection sections 16b are arranged at equal intervals along a periphery of the foreign matter sucking section 16a.

The foreign matter removing device 16 also includes a ranging sensor 16h disposed in an appropriate position in the cover 16d for measuring a distance between the cover 16d and the substrate W. For example, the ranging sensor 16h is disposed at a lower end of the cover 16d to measure a distance between the lower end of the cover 16d and the surface of the substrate W, and outputs a measurement result to the controller 18. Based on the measurement result from the ranging sensor 16h, the controller 18 outputs a control instruction to the head 15 to raise or lower the foreign matter removing device 16 so that the distance between the lower end of the cover 16d and the substrate W is within a specific range.

Figure 4:
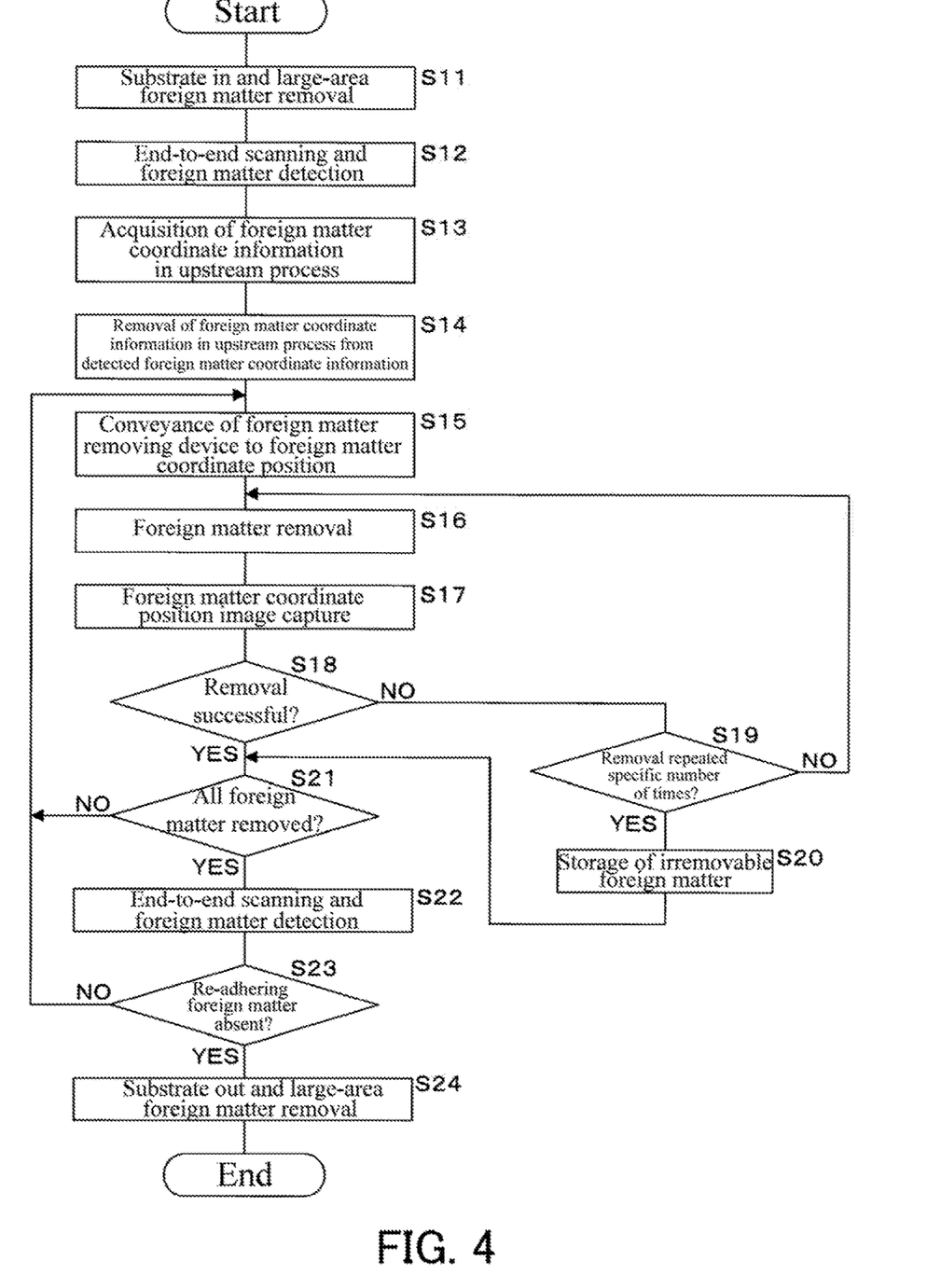
FIG. 4 is a flowchart illustrating steps of foreign matter removal according to the embodiment.

FIG. 4 is a flowchart illustrating steps of the foreign matter removal according to the present embodiment. FIGS. 5A to 5K are schematic illustrations of a foreign matter removing method according to the present embodiment. The control section 18a outputs control instructions to the web cleaner 13 and the table conveyance section 12a to cause the web cleaner 13 to operate and cause the table conveyance section 12a to convey the substrate W into the web cleaner 13 (Step S11). Removal of the foreign matter A adhering to the substrate W is carried out over a large area while the conveyance table 12 is moving from the opposite end to the terminal end, and thus the substrate W is passing through the web cleaner 13. Most of the foreign matter A adhering to the substrate W is efficiently removed by the web cleaner 13. However, some of the foreign matter A, such as charged foreign matter A and foreign matter A irremovable by the web cleaner 13, may be left on the substrate W. For example, in an example illustrated in FIGS. 5A and 5B, three pieces of foreign matter A and one piece of embedded foreign matter B are present on the substrate W in FIG. 5A, and one of the three pieces of foreign matter A has been removed by the web cleaner 13 in FIG. 5B.

Figure 5B:
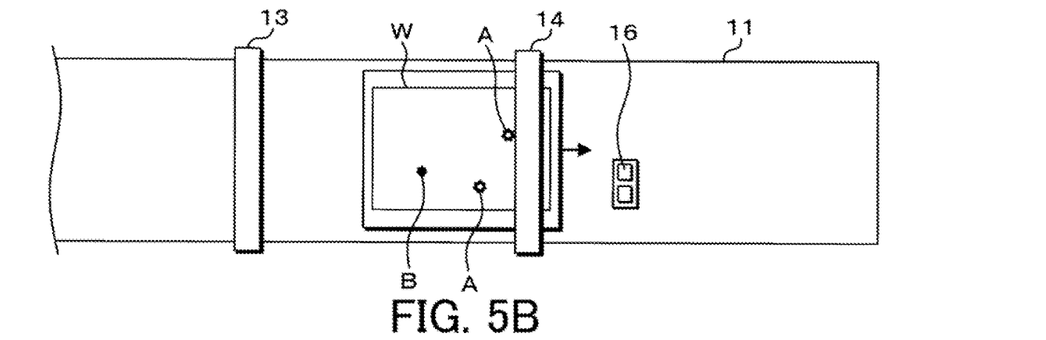
FIG. 5B is a schematic illustration of the foreign matter removing method according to the embodiment.

The control section 18a then outputs control instructions to the scan detector 14 and the table conveyance section 12a to cause the scan detector 14 to detect the positions of the adhering foreign matter A and the embedded foreign matter B on the substrate W while causing the table conveyance section 12a to move the substrate W toward the terminal end as illustrated in FIG. 5B to acquire foreign matter coordinate information (position information) indicating the substrate identifier and the positions of the foreign matter A and the embedded foreign matter B (Step S12). Note that the control section 18a that performs the process of Step S12 is equivalent to a position information acquiring section that acquires the position information indicating the position of the foreign matter A from the scan detector 14. The control section 18a then acquires foreign matter coordinate information in an upstream process from the management device 4 via the communication section 18d and stores the acquired foreign matter coordinate information in the storage section 18h (Step S13). Specifically, the control section 18a acquires the foreign matter coordinate information indicating the position of the embedded foreign matter B embedded in the substrate W during the formation of the alignment film on the substrate W by the alignment film forming device 2.

The control section 18a then specifies a region of the substrate W toward which the gas is to be injected by removing the foreign matter coordinate information in the upstream process from the foreign matter coordinate information acquired from the scan detector 14 (Step S14). That is, the control section 18a specifies coordinate positions of the foreign matter A adhering to the surface of the substrate W, which in other words are coordinate positions of the foreign matter A that is removable by a gas jet.

Figure 5C:
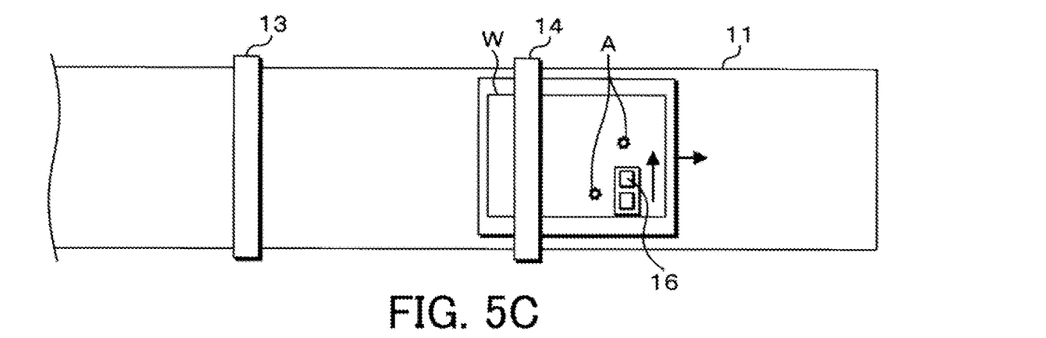
FIG. 5C is a schematic illustration f the foreign matter removing method according to the embodiment.
Figure 5D:
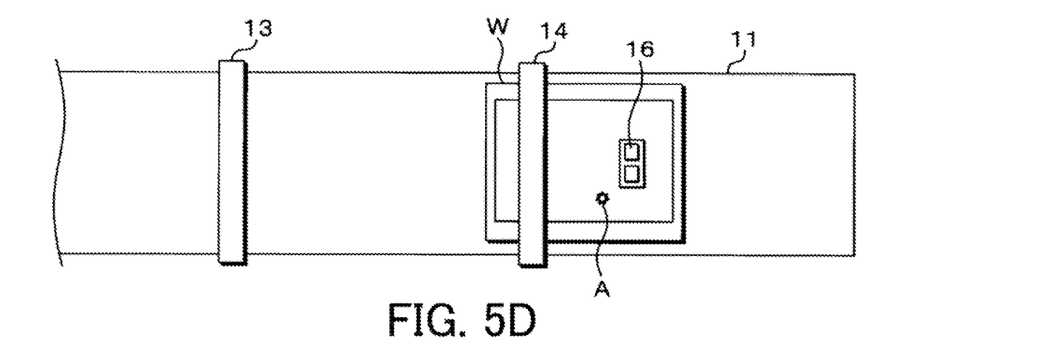
FIG. 5D is a schematic illustration of the foreign matter removing method according to the embodiment.
Figure 5E:
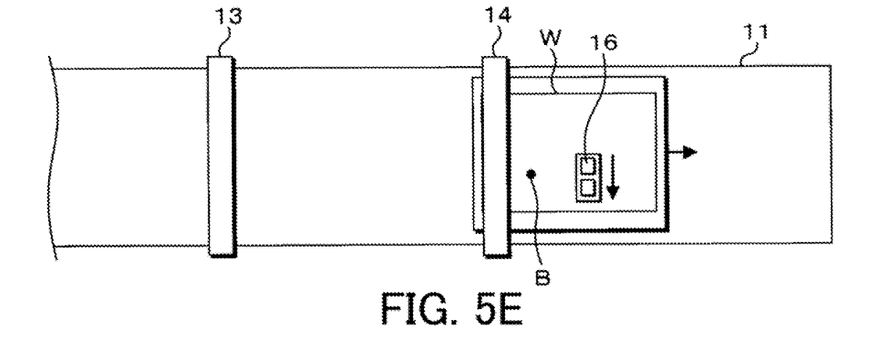
FIG. 5E is a schematic illustration of the foreign matter removing method according to the embodiment.

The control section 18a then outputs control instructions based on the foreign matter coordinate information specified in Step S14 to the table conveyance section 12a and the head conveyance section 15a so that the foreign matter removing device 16 comes to the region indicated by the foreign matter coordinate information specified in Step S14 as illustrated in FIGS. 5C and 5D (Step S15). Note that the substrate W is kept in a specific position relative to the conveyance table 12, and the control section 18a knows the current position of the substrate W from control histories of the conveyance table 12 and the head 15. The control section 18a therefore calculates a conveyance amount, which is equivalent to a difference between a position to which the substrate W is to be conveyed and the current position of the substrate W, generates the control instructions according to the conveyance amount, and outputs the thus generated control instructions to the table conveyance section 12a and the head conveyance section 15a.

The control section 18a then outputs a control instruction to the foreign matter removing device 16 to cause the foreign matter removing device 16 to inject and suck the gas to perform removal of the foreign matter A (Step S16). The control section 18a that performs the processes of Steps S15 and S16 is equivalent to an injection control section that causes gas to be injected toward a specified region.

The control section 18a then outputs control instructions to the head conveyance section 15a and the imaging device 17 to cause the head conveyance section 15a to convey the imaging device 17 to the region subjected to the gas jet and cause the imaging device 17 to capture an image of the region to acquire the captured image (Step S17). The control section 18a then determines whether or not the removal of the foreign matter A has been successful based on the captured image acquired (Step S18). Upon determining that the removal has been unsuccessful (NO in Step S18), the control section 18a stores the cumulative number of times of the foreign matter removal that has been performed on the same region and determines whether or not the cumulative number of times has reached a specific number of times (Step S19). Upon determining that the cumulative number of times of the foreign matter removal has not reached the specific number of times (NO in Step S19), the control section 18a returns the process to Step S16. Upon determining that the cumulative number of times of the foreign matter removal has reached the specific number of times (YES in Step S19), the control section 18a stores information including image data representing the irremovable foreign matter A, the coordinate positions of the irremovable foreign matter A, and the substrate identifier in the storage section 18b (Step S20). Alternatively, the control section 18a may transmits the information including the image data representing the irremovable foreign matter A, the coordinate positions of the irremovable foreign matter A, and the substrate identifier to the management device 4 through the communication section 18d.

Upon completing the process of Step S20 or determining that the removal of the foreign matter A has been successful in Step S18 (YES in Step S18), the control section 18a determines whether or not the foreign matter removal has been performed on all of regions specified in Step S15 (Step S21). Upon determining that the foreign matter removal has not been performed on all of the regions (NO in Step S21), the control section 18a returns the process to Step S15, so that the foreign matter removal is performed on the remaining foreign matter A. For example, in an example illustrated in FIGS. 5C to 5E, two pieces of foreign matter A have been removed. Upon such removal, however, the second piece of foreign matter A has flown out through a gap between the cover 16d and the substrate W and has re-adhered to the substrate W as detached foreign matter C as illustrated in FIG. 5F.

Figure 5F:
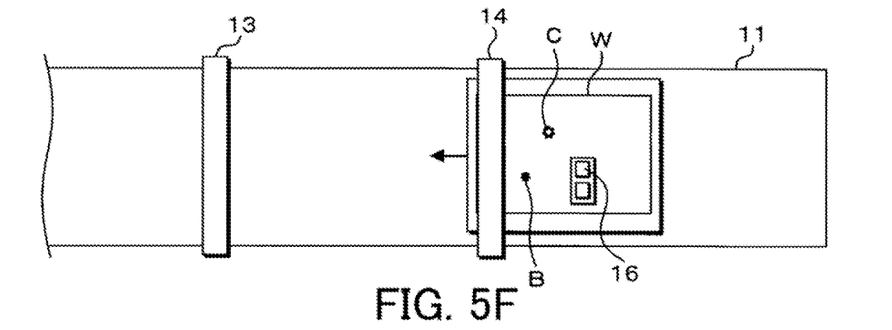
FIG. 5F is a schematic illustration of the foreign matter removing method according to the embodiment.
Figure 5G:
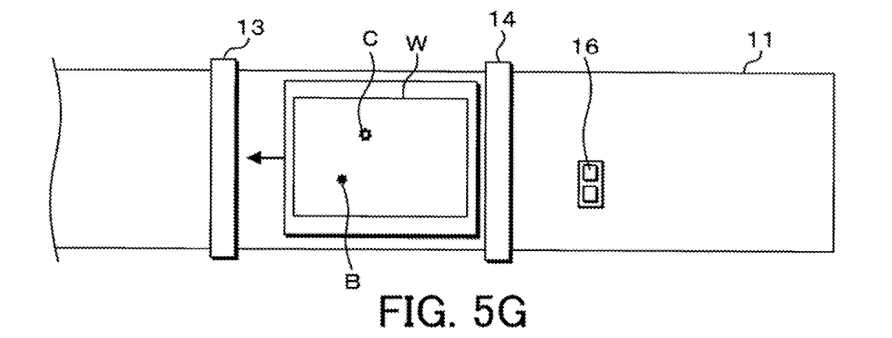
FIG. 5G is a schematic illustration of the foreign matter removing method according to the embodiment.

Upon determining that the foreign matter removal has been performed on all of the regions (YES in Step S21), the control section 18a outputs control instructions to the scan detector 14 and the table conveyance section 12a to cause the scan detector 14 to redetect the positions of the adhering foreign matter A and the embedded foreign matter B on the surface of the substrate W while causing the table conveyance section 12a to move the substrate W toward the opposite end as illustrated in FIGS. 5F and 5G to acquire foreign matter coordinate information indicating the position of the foreign matter A (Step S22). The control section 18a then determines whether or not the substrate W has any detached foreign matter C re-adhering thereto based on the foreign matter coordinate information acquired in Step S22, the foreign matter coordinate information acquired in Step S13, and the foreign matter coordinate information related to the irremovable foreign matter A stored in the storage section 18b (Step S23). Specifically, the control section 18a can determine the presence or absence of the re-adhering detached foreign matter C and specify the coordinate positions of such detached foreign matter C by removing the foreign matter coordinate information in the upstream process and the foreign matter coordinate information related to the irremovable foreign matter A from the foreign matter coordinate information acquired from the scan detector 14 in the process of Step S22.

Figure 5H:
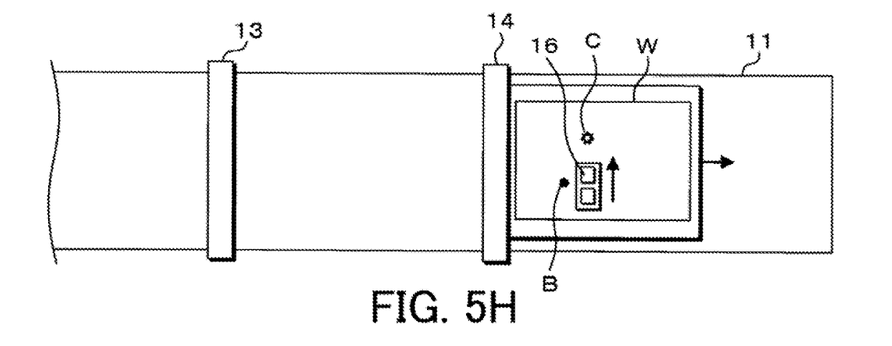
FIG. 5H is a schematic illustration of the foreign matter removing method according to the embodiment.
Figure 5I:
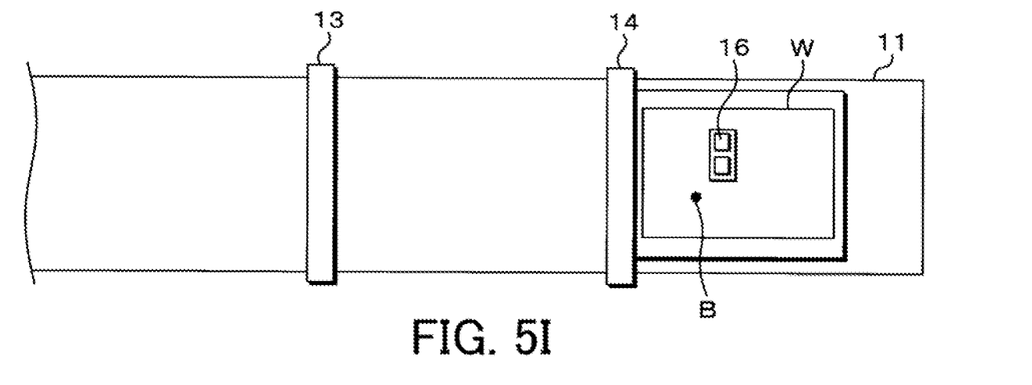
FIG. 5I is a schematic illustration of the foreign matter removing method according to the embodiment.
Figure 5J:
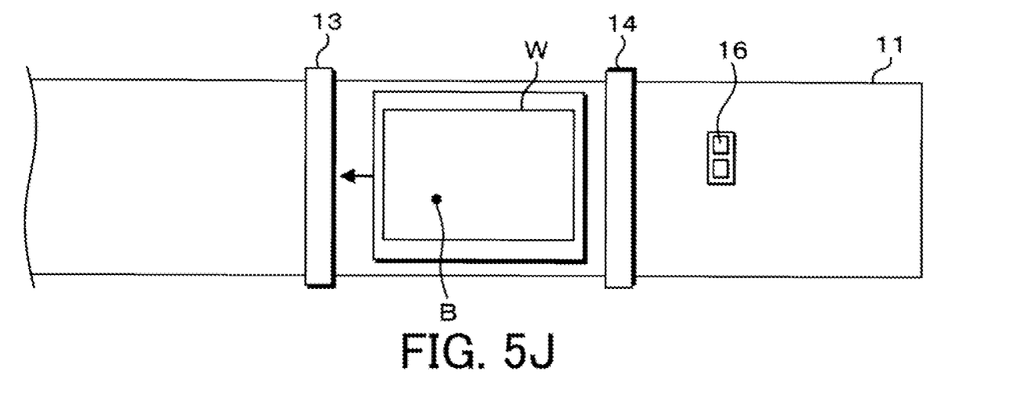
FIG. 5J is a schematic illustration of the foreign matter removing method according to the embodiment.
Figure 5K:
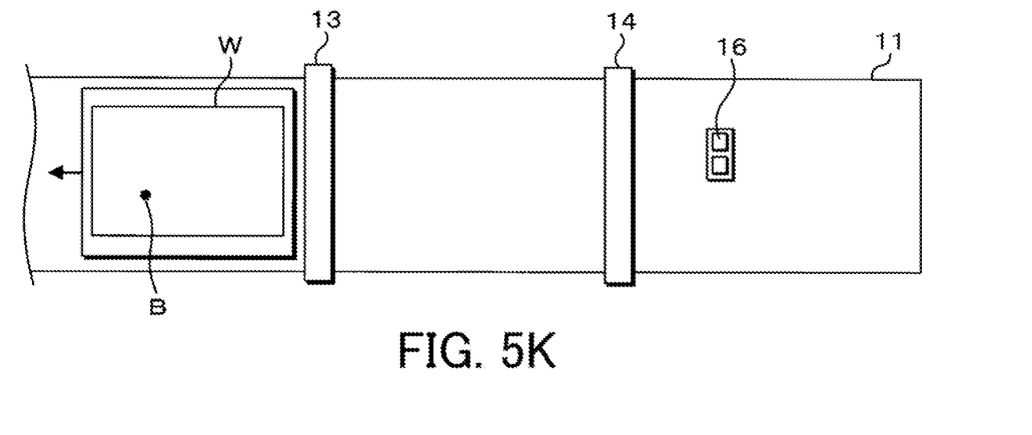
FIG. 5K is a schematic illustration of the foreign matter removing method according to the embodiment.

Upon determining that the substrate W has the detached foreign matter C re-adhering thereto (NO in Step S23), the control section 18a returns the process to Step S15 and performs the above-described foreign matter removal on the detached foreign matter C as illustrated in FIGS. 5G to 5I. Upon determining that the substrate W has no detached foreign matter C re-adhering thereto (YES in Step S23), the control section 18a outputs control instructions to the web cleaner 13 and the table conveyance section 12a to cause the web cleaner 13 to operate and cause the table conveyance section 12a to convey the substrate W out of the web cleaner 13 as illustrated in FIGS. 5J and 5K (Step S24).

According to the foreign matter removing device 16, the foreign matter removing system 1, and the foreign matter removing method having the above-described configuration, it is possible to remove the foreign matter A adhering to the surface of the substrate W adequately compared to the web cleaner 13 that performs suction removal of the foreign matter A across the width of the substrate W.

In particular, the foreign matter removing device 16 according to the present embodiment injects gas locally toward a specified region having the foreign matter A adhering thereto and sucks the injected gas. The foreign matter removing device 16 having such a configuration can therefore remove the foreign matter A adhering to the substrate W effectively.

Furthermore, the injection sections 16b inject ionized gas. The foreign matter removing device 16 having such a configuration can therefore discharge the foreign matter A electrostatically adhering to the substrate W, and thus remove the foreign matter A effectively.

Furthermore, the foreign matter removing device 16 includes the cover 16d that covers a region toward which the gas is injected. The foreign matter removing device 16 can therefore effectively prevent the foreign matter 1 from flying to another region due to the blow of the gas.

Furthermore, the injection sections 16b inject gas from different directions toward the same region having the foreign matter A adhering thereto. The foreign matter removing device 16 having such a configuration can therefore remove the foreign matter A effectively compared to a device having a configuration in which gas is injected from a specific direction.

Furthermore, the voltage applicator 16g applies voltage to the cover 16d to charge the cover 16d. The cover 16d can therefore catch the foreign matter A that has been detached by a gas jet and that has not been sucked by the foreign matter sucking section 16a by attracting the foreign matter A thereto using electrostatic force. The foreign matter removing device 16 can therefore effectively prevent the foreign matter A from re-adhering to the substrate W, and thus remove the foreign matter A efficiently.

Furthermore, the foreign matter removing system 1 according to the present embodiment specifies a region of the surface of the substrate W to which the foreign matter A that is removable by a gas jet is adhering before performing removal of the foreign matter A. The foreign matter removing system 1 having such a configuration can therefore remove the foreign matter A adequately and efficiently.

Furthermore, the foreign matter removing system 1 can specify the position of the foreign matter A adhering to the surface of the substrate W, which in other words is a region to which the gas is to be injected, through a simple process by removing the coordinate positions of the foreign matter A embedded in the substrate W during the alignment film formation from the coordinate positions of the foreign matter A detected through scanning of the substrate W.

Furthermore, the foreign matter removing system 1 re-scans the substrate W to detect the detached foreign matter C re-adhering to the substrate W and performs removal of the re-adhering detached foreign matter C after the foreign matter removal using the foreign matter removing device 16 has been performed. Such a configuration allows the foreign matter removing device 16 to remove the foreign matter A that has been detached and re-adhered to the substrate W as the detached foreign matter C, if any.

Furthermore, the foreign matter removing device 16 performs local removal of the foreign matter A remaining on the substrate W after the web cleaner 13 has performed large-area short-period removal of the foreign matter A adhering to the substrate W. Such a configuration allows the foreign matter removing system 1 to remove the foreign matter A efficiently compared to a configuration in which the foreign matter removing device 16 is used to remove all the foreign matter A.

Furthermore, when any foreign matter A is left unre-moved even after the cumulative number of times of the foreign matter removal performed thereon by the foreign matter removing device 16 has reached a specific number of times, image data of such foreign matter A is stored. Such a configuration allows a user of the system to obtain data indicating the type of foreign matter A that can be problem-atic, data indicating the position thereof, data serving as a basis for the removing method, and the like.

Additionally, a similarity may be calculated between image data obtained by capturing an image of the foreign matter A for which the foreign matter removal has been determined to be unsuccessful in Step S18 and image data of irremovable foreign matter A stored in the storage section 18b. According to such a configuration, the control section 18a may reduce the specific number of times for repetition of the foreign matter removal when the similarity is equal to or greater than a specific value. Alternatively, the control section 18a may end the foreign matter removal on the relevant region without performing further foreign cutter removal when the similarity is equal to or greater than the specific value. Such a configuration allows for more accurate determination of the foreign matter A that is removable and for efficient removal of the foreign matter A.

The present embodiment has been described as having a configuration in which the removal of the foreign matter A on the substrate W is performed immediately before bonding of a TFT substrate and a color filter substrate. However, another configuration may be employed in which the removal of the foreign matter A is performed using the foreign matter removing device 16 according to the present embodiment before a different process to be performed on the substrates.

Furthermore, the present embodiment has been described using an example in Which the substrate W is conveyed back and forth along the conveyance path 11. However, another configuration may be employed in which detection and removal of the foreign matter A is performed while the substrate W is conveyed in one direction along the convey-ance path 11.

Furthermore, the present embodiment has been described using an example in which the foreign matter removing device 16 included in the foreign matter removing system 1 for performing the processes illustrated in FIG. 4 has the cover 16d illustrated in FIG. 2. However, the foreign matter removing device 16 included in the foreign matter removing system 1 is not limited to such a configuration. For example, the foreign matter removing device 16 may omit the cover 16d.

Note that the presently disclosed embodiment is merely an example in all aspects and should not be construed to be limiting. The scope of the present invention is indicated by the claims, rather than by the description given above, and includes all variations that are equivalent in meaning and scope to the claims.

REFERENCE SIGNS LIST

1 Foreign matter removing system
2 Alignment film forming device
3 Bonding device
4 Management device
11 Conveyance path
12 Conveyance table
2a Table conveyance section
13 Web cleaner
4 Scan detector
15 Head
15a Head conveyance section
16 Foreign matter removing device 16a Foreign matter sucking section
16b Injection section
16c Retaining section
16d Cover
16e Suction pump
16f Ionizer
16g Voltage applicator
16h Ranging sensor
17 Imaging device
18 Controller
18a Control section
18b Storage section
18c Input/output section
18d Communication section
41 Database
A Foreign matter
B Embedded foreign matter
C Detached foreign matter
W Substrate

The invention claimed is:

1. A foreign matter removing system comprising:
a detector configured to detect a position of foreign matter adhering to or embedded in a surface of a substrate;
a foreign matter removing device configured to inject gas toward a region of the substrate and suck the gas to perform removal of the foreign matter adhering to the surface of the substrate, the region having a width shorter than an entire width of the substrate; and
a controller configured to control operation of the foreign matter removing device based on a result of the detection by the detector, wherein
the controller includes:
a position information acquiring section configured to acquire position information indicating the position of the foreign matter from the detector;
a specifying section configured to specify the region of the substrate toward which the gas is to be injected based on the position information acquired by the position information acquiring section; and
an injection control section configured to cause the gas to be injected toward the region specified by the specifying section, wherein the detector re-detects a position of foreign matter adhering to or embedded in the surface of the substrate after the gas has been injected toward the region specified by the specifying section.

2. The foreign matter removing system according to claim 1, wherein
the controller includes a storage section configured to store therein position information indicating the position of the foreign matter that is acquired in an upstream process preceding the foreign matter removal, and
the specifying section specifies the region of the substrate toward which the gas is to be injected by removing the position information stored in the storage section from the position information acquired by the position information acquiring section.

3. The foreign matter removing system according claim 1, wherein
upon the specifying section specifying another region toward which the gas is to be injected, the controller causes the gas to be injected toward the other region specified by the specifying section.

4. The foreign matter removing system according to claim 1, further comprising
a web cleaner configured to perform removal of the foreign matter adhering to the substrate over a larger area of the substrate than the foreign matter removing device does, wherein
the substrate is each of liquid-crystal panel substrates for enclosing a liquid crystal therebetween,
the web cleaner performs the removal of the foreign matter adhering to the substrate before the substrate is bonded to another substrate and after an alignment film has been formed on each of the two substrates, and
the detector detects a position of foreign matter adhering to or embedded in the surface of the substrate after the removal has been performed by the web cleaner.

* * * * *